UNITED STATES PATENT OFFICE.

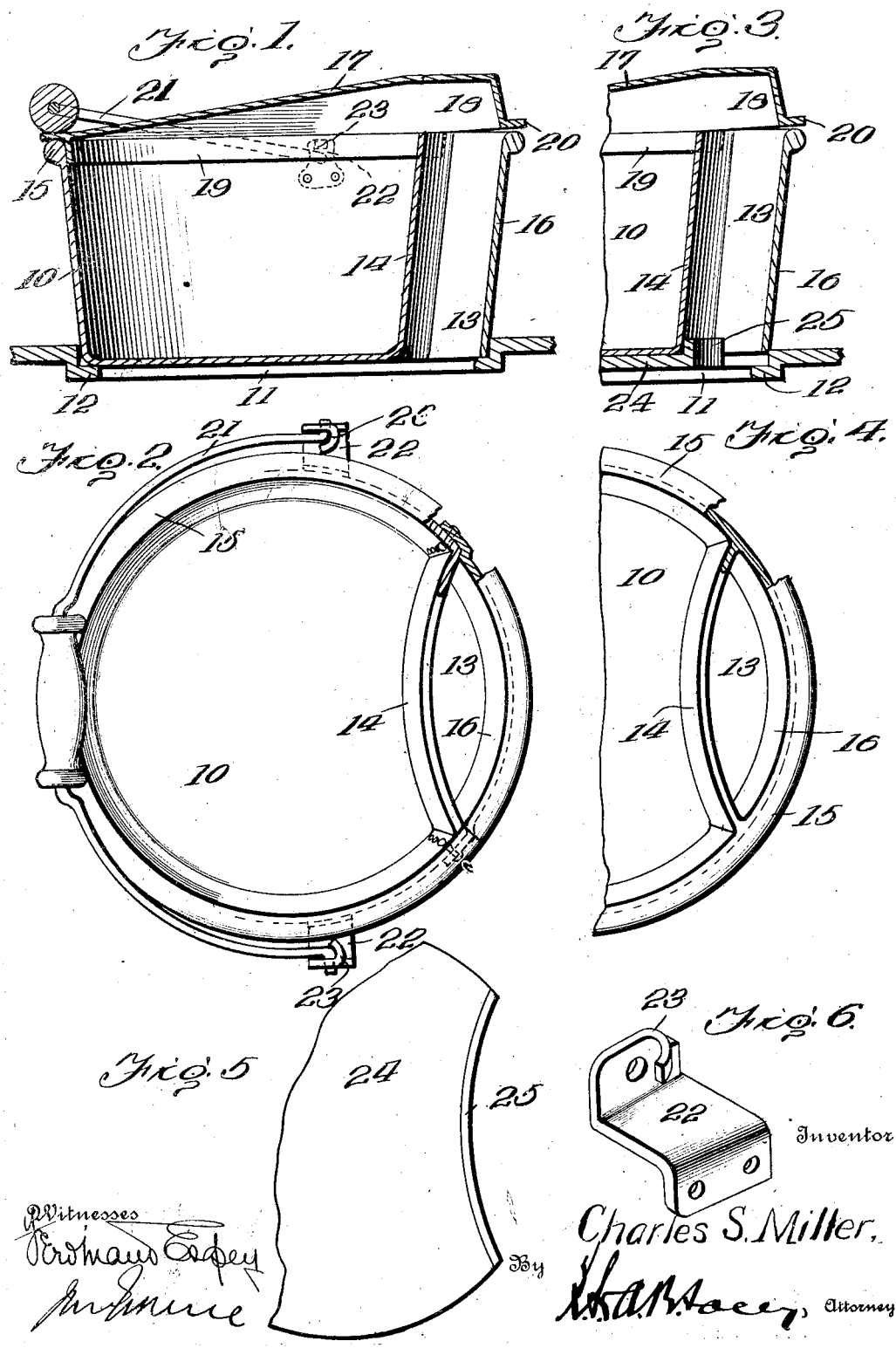

CHARLES S. MILLER, OF MASSILLON, OHIO.

CULINARY VESSEL.

1,126,821. Specification of Letters Patent. Patented Feb. 2, 1915.

Application filed August 22, 1913. Serial No. 786,195.

*To all whom it may concern:*

Be it known that I, CHARLES S. MILLER, citizen of the United States, residing at Massillon, in the county of Stark and State of Ohio, have invented certain new and useful Improvements in Culinary Vessels, of which the following is a specification.

This invention relates to improvements in culinary vessels of the class wherein provision is made for disposing of the steam and vapors rising therefrom and preventing the same from passing into the room in which the vessel is located, and has for one of its objects to simplify and improve the construction and increase the efficiency and utility of devices of this character.

Another object of the invention is to provide a simply constructed device of this character which will be prevented from leaking in event of the fracture of the fumes conducting attachment.

Another object of the invention is to provide a device of this character wherein provision is made for preventing condensed matter from passing into the vapor escape flue.

With these and other objects in view the invention consists in certain novel features of construction as hereinafter shown and described and then specifically pointed out in the claims, and in the drawings illustrative of the preferred embodiment of the invention.

Figure 1 is a sectional elevation of the improved device arranged upon a portion of a cooking range or stove. Fig. 2 is a plan view partly in section of the vessel portion of the improved device. Fig. 3 is a sectional detail illustrating a modification in the construction. Fig. 4 is a plan view partly in section of the vessel portion of the structure shown in Fig. 3. Fig. 5 is a detail view of a portion of a griddle employed in connection with the improved vessel. Fig. 6 is an enlarged detached perspective view of one of the bail ears.

Corresponding and like parts are referred to in the following description and indicated in all the views of the drawings by the same reference characters.

The improved device comprises a receptacle or vessel 10 of any suitable material and of any required size and adapted to fit within the griddle opening of a cook stove, the griddle opening being represented conventionally at 11 and surrounded by a supporting ledge or flange 12 on which the vessel 10 rests, as shown in Fig. 1.

The vessel 10 is formed with a depression indicated at 13 at one side which is defined by an inwardly curving wall 14, the latter wall and the remainder of the vessel being preferably constructed of one single piece. When the vessel is constructed of cast iron or the like the inwardly curving wall 14 will be cast in one piece with the remainder of the vessel as represented in Figs. 1 and 2.

The upper rim or edge of the vessel is preferably formed with an outwardly directed or overhanging flange 15 of the usual form. Bearing over the depression 13 is a segmental member 16 corresponding in curvature with the side portion of the vessel 10 and forming a closure to the recess. By this arrangement the circumference of the vertical walls of the vessel is completed and continuous so that the vessel together with the member 16 completely fills the griddle opening 11 of the stove and disposes the lower open end of the depression 13 above the griddle opening 11. The recess 13 thus forms a substantially vertical flue which opens at its upper end above the upper edge of the vessel and at its lower end below the lower face of the same.

A cover of novel construction forms a part of the present invention and is represented as a whole at 17 and is formed to rise gradually from the side of the vessel opposite to the flue 13 as represented at 18 leaving a free passage for the fumes from the vessel into the flue, while at the same time the inclined or oblique lower face of the cover causes any matter which may be condensed in its passage from the vessel to the flue to run back into the vessel, instead of being carried into the flue. The cover 17 being located at a considerable distance above the fire within the stove or range is heated to a less extent than the lower part of the vessel, consequently the vapors rising from the contents of the vessel will be condensed upon the underface of the cover and caused to flow back into the vessel upon the inclined lower face of the cover. This is an important advantage in applicant's device and materially increases its efficiency and utility.

The cover 17 is provided with a flange 19 which depends from the portion of the cover which is located over the main part of the vessel and does not extend over the flue 13, while the portion of the flange 20 which extends around the outer wall of the flue 13 is spaced slightly away from said outer wall. By this arrangement a limited quantity of air is drawn in between the flange 20 and the upper edge of the member 16 and materially assists in the downward flow of the fumes, gases and steam rising from the vessel, and thus accelerates the circulation and the progress of the fumes into the fire chamber of the stove. This is also an important feature of applicant's device and materially increases its efficiency and utility.

The member 16 may be formed integral with the vessel 10 and its vertical defining wall 14 as represented in Figs. 3 and 4, but this would not constitute a departure from the principle of the invention or sacrifice any of its advantages.

The bail represented conventionally at 21 is connected to the body 10 slightly at one side of the center by ears 22 to balance the extra weight of the partition 14 and the surplus portion of the cover 17. One of the ears is represented in perspective in Fig. 6, and each ear is provided with a stop lug 23 to receive the bail and limit its movement in one direction so that the vessel will not tilt toward the side opposite to the partition 14, and also to prevent the bail from being turned down over the higher side of the cover.

A griddle of improved construction likewise forms a part of the present invention and is represented conventionally at 24 and is provided with a cutout portion on one side to correspond to the flue 13, so that when it is desired to locate the vessel upon the top of the stove the improved griddle is substituted for the ordinary griddle of the stove and is so located that the flue 13 registers with the cut-out portion of the griddle, and to insure the retention of the griddle in the proper position relative to the flue, the griddle is provided with an upwardly directed curved stop rib 25 with which the outer face of the partition 14 engages as represented in Fig. 3.

Having thus described the invention, what is claimed as new is:

1. A culinary vessel having a vapor flue at one side and a cover for said vessel with the portion which is located above the flue spaced above the same and sloping continuously downward toward the upper edge of the vessel at the side opposite to the flue, the lower edge of the portion of the cover which is located above the flue being inclined relative to the adjacent upper edge of the same to provide an intake vent to accelerate the downward currents through the flue.

2. A culinary vessel having a vapor flue at one end, and a cover for said vessel having a lateral flange engaging above the rim of the vessel and a depending rim engaging within the body of the vessel, said depending rim being cut away where the flue is located and the portion of the flange which is located above the flue spaced away from the same to provide a vent to the flue.

In testimony whereof I affix my signature in presence of two witnesses.

CHARLES S. MILLER. [L. S.]

Witnesses:
ARRINE SANDS,
A. F. STAHL.